United States Patent Office 3,269,916
Patented August 30, 1966

3,269,916
FERMENTATION PROCESS FOR PRODUCING
GUANOSINE 5'-PHOSPHATES
Arnold L. Demain, Westfield, N.J., assignor to Merck & Co., Inc., Rahway, N.J., a corporation of New Jersey
No Drawing. Filed June 21, 1963, Ser. No. 289,748
6 Claims. (Cl. 195—28)

This application is a continuation-in-part of my copending application Serial No. 201,745, filed June 12, 1962, now abandoned.

This invention relates to the preparation of guanosine 5'-phosphates. More particularly, it is concerned with the method of preparing these 5'-phosphates by growing suitable strains of microorganisms in fermentation mediums.

The 5'-phosphates of the various nucleosides, such as guanylic acid and inosinic acid, are valuable flavoring agents for foods, beverages and seasonings. The addition of small amounts of these nucleosides greatly enhances the taste of various foods, beverages and seasonings.

The nucleoside 5'-phosphates can be prepared by the enzymatic hydrolysis of ribonucleic acid. However, this method of preparing these products is comparatively expensive, and other methods more suitable for the production of these products on a commercial scale have been sought.

It is an object of the present invention to provide an economical process for the preparation of guanosine 5'-phosphates by fermentation. Another object is to provide a method of obtaining nucleoside 5'-phosphates from the fermentation broth. Other objects will be apparent from the detailed description of this invention hereinafter provided.

In accordance with the present invention, it is now found that guanosine 5'-phosphates are produced by growing strains of *B. subtilis* low in nucleotidase in suitable aqueous mediums. Thus, the cultivation of these strains in suitable fermentation mediums results in the accumulation of the guanosine 5'-phosphates in the fermentation broth. The product so obtained can then be recovered from the resulting broth.

The fermentation of the *B. subtilis* strain is carried out in aqueous mediums containing sources of carbon and nitrogen assimilable by the organism. Suitable sources of carbon for use in these fermentations are carbohydrates such as starch and maltose. Various complex sources of nitrogen such as soybean meal and casein hydrolysate can be used as the assimilable nitrogen source.

It is found that the production of the 5'-nucleotides is stimulated by the presence of a small amount of adenine in a medium although the presence of adenine is not essential to the production of the desired guanosine 5'-phosphates.

The guanosine 5'-phosphates obtained in accordance with this fermentation procedure are a mixture of guanosine monophosphate and guanosine disphosphate. It is also possible that the fermentation product contains other phosphates such as the guanosine triphosphate. The guanosine diphosphate and triphosphate recovered from the fermentation broths can be converted to guanosine monophosphate by heating.

The strains of *B. subtilis* useful in carrying out the processes of the present invention include those strains which are low in nucleotidase. Suitable strains of *B. subtilis* low in nucleotidase can be prepared by mutation pursuant to methods well known in this art. The mutated strains can be tested as described herein to determine whether the strains produce the desired guanosine 5'-phosphates.

One strain of *B. subtilis* which is particularly useful in producing these desired products has been deposited with the Department of Agriculture at Peoria, Illinois, where it is available under the ascension number NRRL B–2911.

The following examples are illustrative of methods of producing the guanosine 5'-phosphates in accordance with this invention.

Example 1

A fermentation medium containing the listed components is prepared as follows:

| | G. |
|---|---|
| Soybean meal extract [1], 1 liter. | |
| Soluble starch | 80 |
| Sodium citrate | 11.7 |
| Adenine sulfate | 0.015 |
| $(NH_4)_2HPO_4$ | 19.8 |
| KCl | 1.5 |
| $MgSO_4 \cdot 7H_2O$ | 0.493 |
| $CaCl_2 \cdot 2H_2O$ | 0.147 |

[1] 50 g. of pulverized soybean meal is steamed for one hour in one liter of 0.025 N sodium hydroxide, filtered through three layers of cheesecloth and made to one liter with water.

40 ml. of this medium is dispensed into 250 ml. Erlenmeyer flasks and the flasks and contents sterilized by autoclaving for 15 minutes at 120° C.

The medium is then inoculated with 0.01 volume of a dilute slant suspension of a slant growth of *B. subtilis* NRRL B–2911 in 0.1 M phosphate buffer (pH 6). The inoculated flasks are then incubated at 28° C. on a rotary shaker imparting a rotary motion of 220 r.p.m. for 11 days. After the fermentation period the broth is extracted with 7% perchloric acid and the neutralized extract assayed microbiologically with *B. subtilis* G295 by the procedure described below.

The extraction with perchloric acid is carried out by adding one tenth volume of 70% perchloric acid to the fermentation broth, centrifuging to remove the precipitated proteins, and neutralizing the supernatant layer with an alkali.

An assay of the perchloric acid extract showed the broth contained 255 μg. guanine equivalents per ml. Alternatively, the cells can be removed by centrifugation and the supernatant broth assayed.

The assay is a microbiological tube procedure using *B. subtilis* G295, a guanine-requiring mutant which responds to guanine and guanine-containing nucleosides and nucleotides. The double-strength assay medium contains per liter:

| | G. |
|---|---|
| Glucose | 20 |
| NBC vitamin-free casein hydrolysate (acid), salt-free | 20 |
| $K_2HPO_4$ | 6 |
| $KH_2PO_4$ | 2 |
| $NH_4Cl$ | 1 |
| $NH_4NO_3$ | 0.2 |
| $Na_2SO_4$ | 0.2 |
| $MgSO_4 \cdot 7H_2O$ | 0.02 |
| $FeSO_4 \cdot 7H_2O$ | 0.002 |
| $MnSO_4 \cdot H_2O$ | 0.0016 |
| $CaCl_2$ | 0.0010 |

Ph, 6.8–7.0.

The assay is carried out as follows:

The centrifuged broth or neutralized perchloric acid extract is added to 20 x 175 mm. test tubes followed by water to 5 ml. and then 5 ml. of 2X assay medium. Stainless steel closures are used to cover the tubes. The tubes are autoclaved and inoculated with 1 drop of a dilute spore suspension of *B. subtilis* G295 (2 drops of spore suspension per 10 ml. water). Incubation is for 16 hours at 37° C. on a rotary shaker (220 r.p.m.). Included is a set of tubes containing from 0 to 100 μg./ml. of disodium guanosine monophosphate ($Na_2GMP \cdot 2H_2O$) which corresponds to a guanine content of 0 to 34 μg./ml. After incubation, the optical densities are read in the Lumetron Colorimeter at 660 m$\mu$. Results are recorded in $\mu$g./ml. of guanine equivalents. (If all the activity were due to GMP, the weight of $Na_2GMP \cdot 2H_2O$ could be obtained by multiplying the $\mu$g./ml. guanine equivalents by 2.93.)

A portion of the perchloric acid extract after neutralization obtained as described above was chromatographed on circular sheets of Whatman No. 1 paper using solvent system 1 (n-propanol—$NH_3$—$H_2O$, 6:3:1), system 2 (isobutyric acid—conc. $NH_4OH$—$H_2O$, 66:1:33) and system 3 (isobutyric acid—conc. $NH_4OH$—$H_2O$, 57:4:39). In all three solvent systems, one of the U.V. absorbing bands ran at an $R_f$ similar to that of GMP(5′). The neutralized extract was studied in mixed chromatography with GMP(5′) and also with commercial "guanylic acid" (thought to be a mixture of GMP(2′) and GMP(3′)) in system 1. A band in the extract ran with GMP(5′) but not with commercial guanylic acid.

The various bands and the areas between the bands after chromatography of the neutralized extract in solvent system 1 were cut out, eluted with water, added to bioassay tubes and inoculated with *B. subtilis* G295. Only the band at $R_f$ 0.12 showed bioactivity. This band, in mixed chromatography ran together with GMP(5′) in systems 1, 2, 3 and 4 (60% $(NH_4)_2SO_4$ in 0.1 M phosphate buffer (pH 7)-n-propanol, 50:1) but ran as a separate band when mixed with commercial "guanylic acid."

The neutralized extract was added to a column of Dowex-1-X2 anion exchange resin. The column was washed with 0.005 M HCl which removes guanine and guanosine. The column was then eluted with 0.1 M HCl which removes nucleotides. The samples were assayed and calculation indicated that the original broth contained 50 $\mu$g./ml. guanine plus guanosine calculated as guanine and 570 $\mu$g./ml. guanosine 5′-phosphates calculated as $Na_2GMP \cdot 2H_2O$.

The 0.1 M HCl resin eluate was concentrated by lyophilization and run in mixed circular chromatography with GMP(5′) and commercial "guanylic acid" in solvent systems 1 and 4. Only in the case of GMP(5′), did one of the eluate bands co-chromatograph with the known.

The resin eluate and the band eluted from paper were compared on paper to known nucleotides containing guanine with respect to reaction with the cysteine-sulfuric spray for deoxyribose-containing compounds and with the periodate-benzidine spray for compounds with adjacent hydroxy groups on the sugar moiety with the following results:

|  | Cysteine-sulfuric | Periodate-benzidine |
|---|---|---|
| GMP (5′) | Negative | Positive. |
| Commercial "guanylic acid" | do | Negative. |
| Deoxyguanylic | Positive | Do. |
| Resin eluate | - | ++++. |
| Paper band | {+ / -} | ++. |

The above data indicate that *B. subtilis* NRRL B–2911 accumulates ribo-nucleotides containing guanine with the phosphates attached to the 5′ position of the ribose.

*Example 2*

In another series of experiments *B. subtilis* NRRL B–2911 was grown in the medium described in Example 1 with and without adenine. The fermentation was carried out as described in Example 1 for 10 days at 28° C. After completion of the fermentation, the broth was centrifuged and the supernatant layer assayed as described in Example 1.

The results of these experiments are shown in the following table:

| Additive | Medium Vol. ml. per 250 ml. flask | $\mu$g./ml. Guanine Equivalent |
|---|---|---|
| None | 40 | 120 |
| 15 $\mu$g./ml. adenine sulfate | 40 | 210 |

*Example 3*

In another experiment, *B. subtilis* NRRL B–2911 was grown in the medium described in Example 1 without the adenine sulfate. In this test the medium volume was 20 ml. per 250 ml. Erlenmeyer flask. After completion of the fermentation which was carried out for 10 days at 28° C., the broth was centrifuged and the supernatant broth assayed as described above. The assay showed the presence of 200 $\mu$g./ml. of guanine equivalents.

A portion of the clarified broth was subjected to paper chromatography, the bands cut out, eluted with water and chromatographed over Dowex 1-X2 following the procedures described in Example 1. Assay of the samples of the eluate obtained by washing with the 0.005 M HCl and with the 0.1 M HCl were then assayed. From the assay results it was calculated that the original broth contained 70 $\mu$g./ml. of guanine and guanosine equivalents and 380 $\mu$g./ml. of guanine nucleotides as $$Na_2GMP \cdot 2H_2O$$

*Example 4*

In a further series of experiments, *B. subtilis* NRRL B–2911 was grown in the medium described in Example 1 supplemented with 15 $\mu$g./ml. of adenine sulfate and 30 $\mu$g./ml. of adenine sulfate for 10 days at 28° C. In these experiments, the medium volume was 20 ml. per 250 ml. flask. After completion of the fermentation, the broth was centrifuged and the supernatant layer assayed as described in Example 1. The results are shown in the following table:

| Adenine sulfate $\mu$g./ml.: | Guanine equivalent $\mu$g./ml. |
|---|---|
| 15 | 240 |
| 30 | 295 |

*Example 5*

A medium was prepared as described in Example 1 using 80 g. of maltose in place of the soluble starch. 20 ml. of the medium in a 250 ml. Erlenmeyer flask was sterilized and supplemented with adenine sulfate at the level of 15 $\mu$g./ml. The sterilized medium was inoculated with *B. subtilis* NRRL B–2911 and the inoculated flasks incubated on a rotary shaking machine for 10 days. After completion of the fermentation the broth was centrifuged and the supernatant layer assayed as described in Example 1. The assay results are shown in the following table:

| Guanine Equivalent, $\mu$g./ml. | Guanine and Guanosine as Guanine, $\mu$g./ml. | Guanine Nucleotides as $Na_2GMP \cdot 2H_2O$, $\mu$g./ml. |
|---|---|---|
| 205 | 40 | 480 |

Fermentation broths obtained by growing a particular strain of *B. subtilis* can be tested as described below to ascertain whether the strain is low in nucleotidase activity and therefore suitable for the production of guanosine 5′-phosphates in accordance with this invention.

In this procedure the fermentation broth is centrifuged and 0.5 ml. of the supernatant liquid is mixed with 0.5 ml. of an aqueous solution of disodium guanosine monophosphate dihydrate having a concentration of 5 mg./ml. and one drop of toluene, and the mixture incubated for 16 hours at 28° C. Ten microliters of the resulting incubated mixture is then spotted on circular paper sheets (Whatman No. 1) and chromatographed in the solvent system 1 (n-propanol-$NH_3$-$H_2O$, 6:3:1) for four hours at room temperature. The sheets are then examined under ultraviolet light for intensities of the guanosine 5'-phosphate band ($R_f$ 0.14) and guanosine plus guanine band ($R_f$ 0.40). Strains of *B. subtilis* low in nucleotidase show a guanosine plus guanine band which is less intense than the guanosine 5'-phosphates band.

Various changes and modifications of the invention can be made, and to the extent that such variations incorporate the spirit of this invention, they are intended to be included within the scope of the appended claims.

What is claimed is:

1. A process for producing guanosine 5'-phosphates which comprises growing *B. subtilis* NRRL B–2911 in an aqueous nutrient medium containing assimilable sources of nitrogen and carbon for sufficient time to accumulate said phosphates in the fermentation broth and recovering said phosphates from the resulting fermentation broth.

2. The process of claim 1 wherein the aqueous nutrient medium contains a minor amount of adenine.

3. The process of claim 1 wherein soybean meal is used as the source of assimilable nitrogen.

4. The process of claim 1 wherein casein hydrolysate is used as the source of assimilable nitrogen.

5. The process of claim 1 wherein maltose is used as the source of assimilable carbon.

6. The process of claim 1 wherein starch is used as the source of assimilable carbon.

References Cited by the Examiner

UNITED STATES PATENTS

| | | | |
|---|---|---|---|
| 3,031,380 | 4/1962 | Minagawa et al. | 195—78 |
| 3,104,171 | 9/1963 | Sakaguchi et al. | 195—28 |
| 3,111,459 | 11/1963 | Motozaki et al. | 195—28 |
| 3,118,820 | 1/1964 | Uchida et al. | 195—28 |
| 3,135,666 | 6/1964 | Hara et al. | 195—28 |
| 3,139,385 | 6/1964 | Ogata et al. | 195—28 |

FOREIGN PATENTS 1,130,785  6/1962  Germany.

A. LOUIS MONACELL, *Primary Examiner.*

A. E. TANENHOLTZ, *Assistant Examiner.*